(12) United States Patent
Woersching et al.

(10) Patent No.: US 8,464,236 B2
(45) Date of Patent: Jun. 11, 2013

(54) DATA CONSISTENCY IN DATA PROCESSING SYSTEMS

(75) Inventors: Udo Woersching, Leingarten (DE); Martin Lunt, Markgroeningen (DE); Elmar Markus, Fujimino (JP); Uwe Biegert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1281 days.

(21) Appl. No.: 11/547,940

(22) PCT Filed: Mar. 30, 2005

(86) PCT No.: PCT/EP2005/051449
§ 371 (c)(1),
(2), (4) Date: Sep. 26, 2008

(87) PCT Pub. No.: WO2005/098617
PCT Pub. Date: Oct. 20, 2005

(65) Prior Publication Data
US 2009/0049437 A1 Feb. 19, 2009

(30) Foreign Application Priority Data
Apr. 7, 2004 (DE) .......................... 10 2004 017 050

(51) Int. Cl.
*G06F 9/45* (2006.01)

(52) U.S. Cl.
USPC ............ 717/165; 717/162; 717/163; 711/170

(58) Field of Classification Search
USPC ............ 717/165, 162–163; 719/331; 711/170
See application file for complete search history.

(56) References Cited

U.S. PATENT DOCUMENTS

| 5,555,417 A | * | 9/1996 | Odnert et al. ................ 717/159 |
| 5,608,893 A | | 3/1997 | Slingwine et al. |
| 5,802,368 A | * | 9/1998 | Grigsby et al. ............... 719/331 |
| 6,009,426 A | | 12/1999 | Jouenne et al. |

(Continued)

FOREIGN PATENT DOCUMENTS

| DE | 197 28 971 | 1/1999 |
| JP | 11-212807 | 8/1999 |

(Continued)

OTHER PUBLICATIONS

"Introduction to embedded programming", Interface, CQ Publishing Co., Ltd. May 1, 2002 with English translation of Conclusion.

(Continued)

*Primary Examiner* — Chat Do
*Assistant Examiner* — Lynda Dinh
(74) *Attorney, Agent, or Firm* — Kenyon & Kenyon LLP

(57) ABSTRACT

In order to avoid data inconsistency between accesses of different functions of an application to a global variable in a data processing system,
a) symbolic object code of a totality of functions to be executed in the data processing system is provided and those functions of the totality, called interfering functions, are identified, which access an identical global variable;
b) at least one of the interfering functions is selected;
c) a step of the initialization of an auxiliary variable using the value of the global variable into the object code of each function selected in step b) or of a function calling a selected function prior to its call is inserted; and
d) a symbol of the global variable in the object code of the selected function is replaced by a reference to a memory space of the auxiliary variable.

8 Claims, 3 Drawing Sheets

U.S. PATENT DOCUMENTS

| | | | |
|---|---|---|---|
| 6,110,227 A * | 8/2000 | Marcelais et al. | 717/170 |
| 6,529,985 B1 * | 3/2003 | Deianov et al. | 710/260 |
| 6,973,645 B2 | 12/2005 | Hayashida | |
| 7,558,935 B1 * | 7/2009 | Boucher et al. | 711/170 |
| 7,689,979 B1 * | 3/2010 | Sawyer et al. | 717/152 |
| 2003/0041312 A1 | 2/2003 | Fueki | |
| 2004/0003385 A1 * | 1/2004 | Kushlis | 717/158 |

FOREIGN PATENT DOCUMENTS

| | | |
|---|---|---|
| JP | 2001-216168 | 8/2001 |
| JP | 2003-280922 | 10/2003 |
| JP | 2004-38279 | 2/2004 |
| WO | WO 01/90887 | 11/2001 |

OTHER PUBLICATIONS

"Introduction to multithread programming", Linux Japan, Laser 5 Publishing Co., Ltd. Aug. 1, 1999 with English translation by Brian Masney.

"Introduction to UNIX programming for Windows programmers", Interface, CQ Publishing Co., Ltd. Feb. 1, 1999 with English Summary.

* cited by examiner

DATA CONSISTENCY IN DATA PROCESSING SYSTEMS

FIELD OF THE INVENTION

The present invention relates to the problem of data consistency in a data processing system on which a real-time application is running. Such an application generally is made up of a plurality of functions which, without being mutually coordinated in a fixed manner, access jointly used variables, also called global variables, by writing and reading. If to perform a calculation such a function reads such a variable several times in succession and the variable is changed by another function between two such read accesses, then it may be assumed that the result of the calculation will be faulty. Errors occur likewise if a calculation requires several write accesses to the global variable, in which temporary interim results are stored in the variable, if another function establishes read access to such an interim result.

BACKGROUND INFORMATION

In the context of the present application, functions that access an identical global variable are called interfering functions, regardless of whether in a particular case a conflict between the functions is actually possible.

A known technique for ensuring the consistency of global variables in a data processing system whenever a function accesses a global variable that could be disturbed by a coinciding access of an interfering function is to exclude all other functions from accessing the same variable. Such a method, however, is generally not suited for real-time applications since the execution of functions which must access a variable that is excluded from access must be stopped until access to the variable is again permitted, which can result in unpredictable delays in the execution of these functions.

Another known method of ensuring data consistency is to use copies of the global variable for the individual functions. That is to say, an interfering function creates at the beginning of its execution a local copy of a required global variable, subsequently works with this copy, and if the function is capable of changing the variable, then prior to its termination the local variable is copied back into the global variable, the copy processes not being interruptible by other functions.

In the case of complex program systems there is the problem that at the beginning of development it is often not clear at what points access conflicts may arise that can lead to data inconsistencies. This problem could be met by making local copies in each function of all global variables required by the function. Such a procedure, however, leads to a substantially higher requirement in memory and processing power.

At the time of system integration, a statement as to which global variables in which function require a copy is always possible since at this time all functions as well as their call frequency and priority (their right to interrupt other functions) are known. In order to facilitate system integration there exist various software tools such as OLT (offline tool) or ESCAPE (www.etas.com), which on the basis of additional information identify the functions which must work with copies for ensuring data consistency and which change these functions in such a way that instead of the original variables they work with the corresponding copies. In addition, corresponding copying processes are generated. Depending on the operating system configuration, which is static, these copying processes synchronize the copies with their original variables of one or several function(s), which may use joint copies since they do not mutually interrupt one another. Since these tools read the operating system configuration in order to ascertain the priority and grouping of the individual functions, they are also able to insert automatically the required copying processes into the operating system configuration before or after a function or function group.

The application of these tools is limited by the fact that they have to rely on changing the source code. This is not necessarily always available however. Particularly if a development partner is supplied with functions from a third party, this third party for reasons of secrecy will often provide the functions not in the form of source code, but at best as object code. Such functions cannot be processed using the known tools such that to ensure the absence of conflict extensive changes to the functions existing in the source code may be required which cannot be automated and are thus expensive and susceptible to error.

Moreover, the intervention in the source code in each case requires a recompilation of the changed code. Particularly changes in the priority of a function (e.g. operating system configuration) may entail extensive changes in the source code of a great number of other functions. In large program systems this may result in very long compile times, which may substantially slow down the development process.

Another problem is that the known development tools are in each case tailored to specific high-level languages, i.e., are not suited for processing functions written in different high-level languages to form an application.

SUMMARY OF THE INVENTION

The present invention provides methods for avoiding data inconsistency and development tools for applying this method, which are applicable to any functions irrespective of a high-level language in which its source code is written and irrespective of whether a source code is available at all, and which allow for a speedy development.

The advantages are on the one hand achieved by the fact that the method inserts the initialization of an auxiliary variable required for the use of an auxiliary variable directly into the existing object code rather than inserting it into the source code and subsequently compiling this into object code. The insertion may be performed by inserting the program steps required for initialization directly into the identified function or into a function that calls up the identified function prior to its call, or by inserting a jump instruction to an auxiliary function that takes over the initialization.

The auxiliary variable may represent a local variable of the function that uses it, i.e. a variable which is only defined and accessible within this function. In practice, the auxiliary variable is advantageously defined globally, because in that case several interfering functions, which are known not to conflict with one another, may use the same auxiliary variable.

A replacement of accesses of a selected function to the global variable by accesses to the auxiliary variable may occur in two ways. One is individually to identify, in the object code of the selected function initially still existing in symbolic form, the symbol of the global variable, which may exist e.g. as the argument of a write or read instruction, and to replace it by the symbol of the auxiliary variable. A second approach is to replace, when linking the object code, i.e., if all symbols in the object code are replaced by references to concrete memory addresses, the symbol of the global variable in each case directly by a reference to the memory address of the auxiliary variable that replaces it and thus to "bend" the write/read accesses, as it were.

The replacement or "bending" is advantageously performed using a special tool that is able to read an object code file, replace the symbols within it or insert appropriate instructions to a linker, and subsequently write it again as a properly formatted object code file.

In order to prevent the number of functions using an auxiliary variable instead of the global variable from being greater than necessary, the method expediently includes a step c') of identifying functions among the interfering functions, which are able to interrupt one another, the introduction of the auxiliary variables and the replacement of the accesses being applied only to at least one of the functions thus identified. In the case of functions, which can neither be interrupted by another function nor are able to interrupt another function, there exists no danger of data inconsistency such that in their case no replacement is required.

This step c') is suitably performed by the above-mentioned tool, which for this purpose expediently receives as input file, in addition to the object file itself, additional information, preferably in the form of a control file, which states which of several interfering functions are able to be able to be interrupted by another function and which must therefore work with an auxiliary variable instead of the global variable.

The ability of the interfering functions to interrupt one another is stipulated in the additional information preferably by priority values assigned to the functions.

Moreover, the replacements performed on the at least one selected function are preferably logged, e.g. by a simple insertion of the control file into a description section of the executable object file in order to provide this information to a debugger. This additional information offers the debugger the opportunity to understand the replacements made and thus to make the changes executed by the tool transparent to the user of the debugger. This is of interest in particular if at a certain execution time of the software the original variable and the copy contain different values and the user wants to know whether the function he is testing accesses the original variable or a particular copy.

If at least one of the replacements made in the selected function concerns a write access, i.e. if the function is able to change the value of the auxiliary variable, then a step of overwriting the global variable using the value of the auxiliary variable into the object code of the selected function, or of the function calling the selected function, should be inserted after the call in order to make such a change available globally.

The advantages are on the other hand achieved in that symbolic object code is provided for a totality of functions to be executed in the data processing system and that among these the interfering functions are identified, the global variable in the symbolic object code being indicated to each function accessing it by a symbol specific for this function, at least one interfering function being selected, in each selected function or in a function calling a selected function an instruction for copying the global variable to a memory space associated with a function-specific symbol being inserted prior to its call, and for each non-selected function the symbol specific for the function being linked to a memory space associated with the global variable.

In order to make it easier for a tool, which executes the above-defined method, to identify the function-specific symbols corresponding an identical global variable, a table containing the symbols used in the functions for the global variable is advantageously provided.

If the object code of several of the interfering functions is compiled from source code, then a compiler used for this purpose may be provided to replace the identical name of the global variable contained in the source code of the functions by a symbol specific for each function and to create the table.

DETAILED DESCRIPTION

Figure 1:
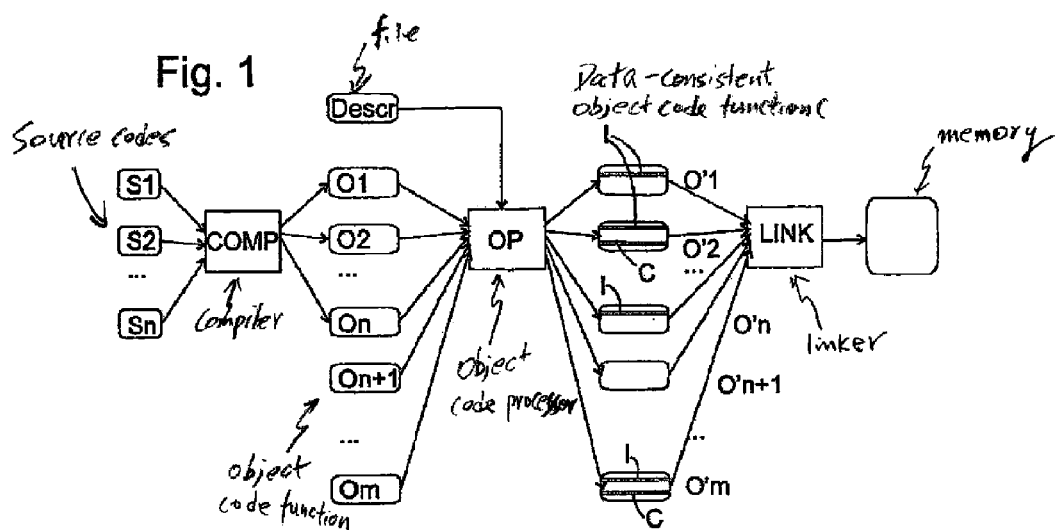
FIG. 1 shows schematic steps of a development tool according to the present invention and data objects exchanged between them.

The development tool shown in FIG. 1 as a first step includes a compiler COMP, which converts source codes S1, S2, ..., Sn, written in a high-level language such as C, of functions of an application under development into symbolic object code functions O1, O2, ..., On. The symbolic object code is made up of instructions, which in each case correspond 1:1 to instructions executable by a target processor for which the source code to be compiled is intended. In contrast to directly executable code, however, they do not refer to fixed memory addresses for write or read accesses and jump instructions, but rather to addresses indicated by symbols, which are assigned a fixed value by linker LINK only in a later phase of processing.

Downstream of compiler COMP, an object code processor OP is connected, which goes over the object codes O1, O2, ..., On of the individual functions produced by the compiler as well as possibly additional object codes On+1, Om of functions not compiled by compiler COMP in order to ensure the consistency of global variables used by several of these functions. Object codes On+1, ..., Om may belong e.g. to functions originally written in a language other than that of source codes S1, S2, Sn or to functions whose source code is not available because it concerns functions purchased by the developer of the application.

Object code processor OP has access to a file DESCR provided by the developer, which specifies for each of the object code functions O1, ..., Om global variables accessed by the function as well as a priority assigned to the function.

Figure 2:
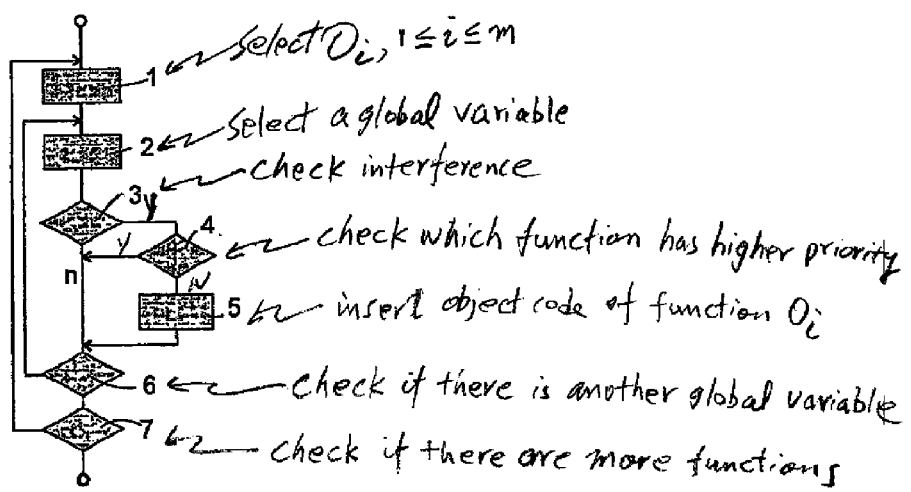
FIG. 2 shows a flow chart of a working process executed in the object processor in FIG. 1.

FIG. 2 represents the processing performed by object code processor OP using a flow chart. One of the object code functions Oi, $1 \leq i \leq m$ is selected in step 1. In step 2, one of the global variables listed in file DESCR for object code function Oi is selected, and in step 3 a check is performed, likewise on the basis of file DESCR, whether there are functions interfering with the selected function Oi, i.e. functions Oj, $1 \leq j \leq m$, $j \neq i$, which access the same global variable. If so, then a check is performed in step S4 as to which of the functions has the higher priority. If the priority of function Oi is lower, then this means that it may be interrupted by the other function Oj, and that thus there is the danger of data inconsistency if the other, higher prioritized function Oj changes the global variable between two read accesses of the first function Oi or gets to read a non-defined intermediate value of the global variable. In this case the object processor inserts into the object code of function Oi prior to the first access to the relevant global variable or into a function calling function Oi prior to the call instructions for copying this variable into an auxiliary variable and replaces all subsequent accesses to the global variable in object code Oi by accesses to the auxiliary variable. If in this replacement it is determined that at least one of the accesses is a write access, then an instruction for copying the value of the auxiliary variable into the global variable is additionally inserted into function Oi to be executed prior to its termination. Alternatively, such an instruction may also be inserted into the calling function following the call.

If the check in step 4 shows that function Oi has the same or higher priority as the other function Oj, then there is no danger that this first function Oi is interrupted by the other function Oj, and the use of a copy is not required. In this case the method proceeds from step 4 directly to step 6.

Step 6 checks whether for function Oi selected in step 1 another global variable is indicated in file DESCR, and if so, then the method returns to step 2 and selects one of these variables. Otherwise, a check is performed in step 7 whether there are still functions to be processed, and if not, then the method terminates.

In this manner, the object processor produces a set of data-consistent object code functions O'1, . . . , O'm, into which, depending on the type of access to a global variable, only instructions for copying the global into a local auxiliary variable (if the function only performs read access, symbolically represented by a single shaded Block I in the cases of functions O'1, O'n), instructions for copying the global into the local variable and back (in the case of write and read access, symbolically represented by two shaded blocks I, C in the case of functions O'2, O'm), or no instructions at all are inserted, as in the case of the function O'n+1, if the respective function has the highest priority, which is assigned to the functions accessing the respective global variable.

The consistent object functions obtained in this manner are integrated to form an executable application in a generally known manner by Linker LINK in that all symbols of the object code are replaced by explicit addresses of memory spaces.

Figure 3:
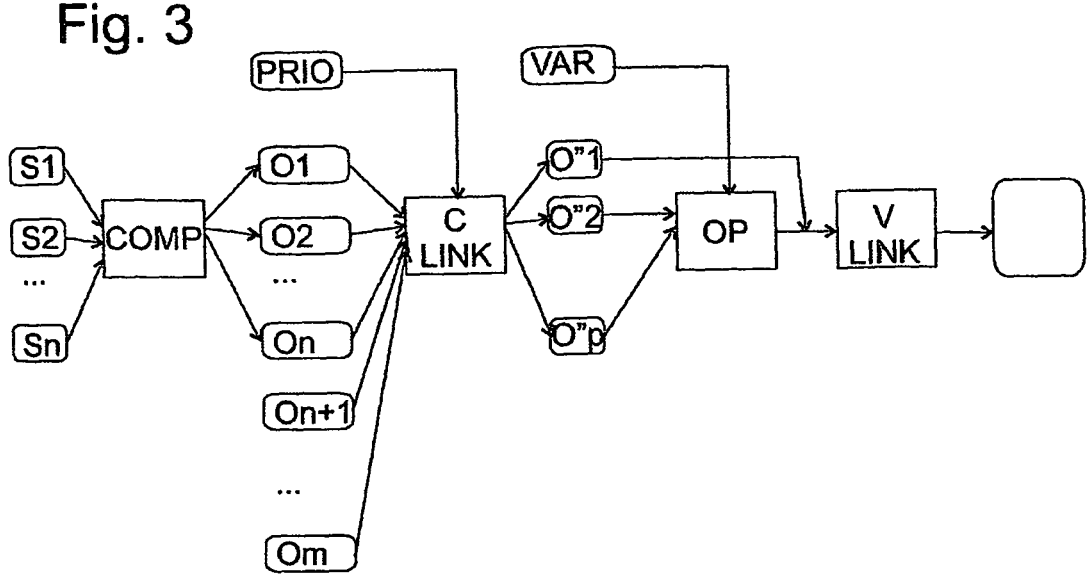
FIG. 3 shows a representation analogous to FIG. 1 of a second embodiment of the present invention.

A preferred refinement of the development tool or of its method of operation is described with reference to FIG. 3. Compiler COMP, the object code functions O1, . . . , On produced by it from source code functions S1, Sn and the external object functions On+1, Om are the same as in FIG. 1. In contrast to FIG. 1, however, these functions are not processed by an object code processor OP to make them data-consistent, but rather they run through a code linker CLINK, which produces object code blocks O"1, . . . , O"p. The number of these blocks corresponds to the number of priority levels assigned to the object code functions and specified for the individual object code functions O1, Om in a file PRIO that is read by code linker CLINK. Each object code block O"1, O"p contains functions of the same priority level. Block O"1 unites the functions having the highest priority, which may safely access their global variables directly and do not require any processing in object code processor OP.

All other blocks O"2 through O"p are subjected in object code processor OP to the consistency processing described with reference to FIGS. 1 and 2. Combining the functions into larger blocks makes the processing in object code processor OP more effective. Since the functions of each individual block do not interrupt one another, they are able to use a common local copy for each global variable, thereby saving memory space.

The consistency-processing blocks O"1 through O"p subsequently run through another linker step, called a variable linker VLINK, which replaces all symbolic references to memory spaces by explicit memory addresses, and jump addresses, which in the code linker have not yet been able to be replaced by explicit addresses because they represented jumps between different blocks, are resolved. Thus finally the completed executable application is obtained.

Figure 4:
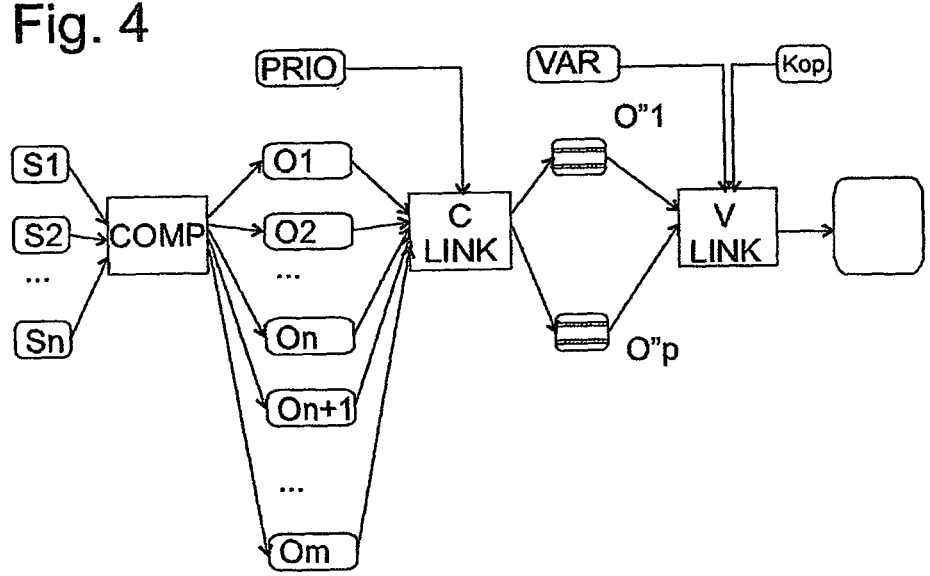
FIG. 4 shows an analogous representation of a third embodiment.

In the refinement shown in FIG. 4, the structure and the processing up to the production of object code blocks O"1, . . . O"p do not differ from that of FIG. 3. The object code processor has been dropped, the method of operation of variable linker VLINK being changed instead. The latter reads file VAR, which specifies the global variables for every function it accesses, and ascertains on the basis of this information the global variables used in each of object code blocks O"2 through O"p. In the linking of the object code blocks, each of these global variables is assigned a different explicit memory address in each block. Subsequently, the variable linker VLINK links each individual function of the object code blocks to copying functions read from a library in such a way that the copying functions are executed in each case at the beginning or at the conclusion of a function, these copying functions in each case copying the global variables used by the respective function to the memory space assigned to them for object code group O"1, . . . , O"p of this function or copying them back. This renders the manipulation of the object code performed in the other exemplary embodiments by object code processor OP superfluous, and nevertheless the result is achieved that all functions, in which there is the danger of an interruption by higher prioritized functions, never access originals, but always only copies of global variables.

Figure 5:
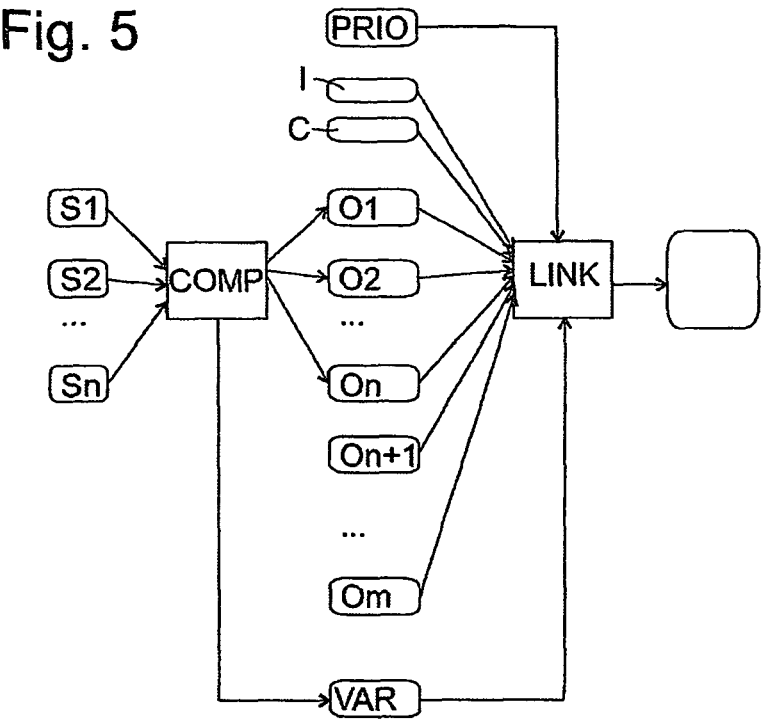
FIG. 5 shows an analogous representation of a fourth embodiment.

FIG. 5 schematically shows the processing steps according to a fourth refinement of the present invention. As in the preceding exemplary embodiments, the first step is a compiler COMP, which converts functions S1, S2, Sn written in a source code into symbolic object code O1, . . . , On. A special feature of the compiler in FIG. 5 is the fact that in the symbolic object code for a global variable used by several functions and indicated by an identical name in their source code, the compiler does not use their source code name in the symbolic object code of all these interfering functions uniformly as symbol for the global variable, but rather uses for the respective function specific symbols for the individual variables in the object code of each function. This may be done e.g. in that the compiler produces symbols of the object code in each case by linking the variable called in a function of the source code with the name of the calling function. That is to say, a global variable indicated by G1 in the source code S1, S2 of functions F1, F2 is assigned the symbol G1_F1 or G1_F2 in the object codes O1, O2 of the respective functions produced by the compiler.

Figure 6:
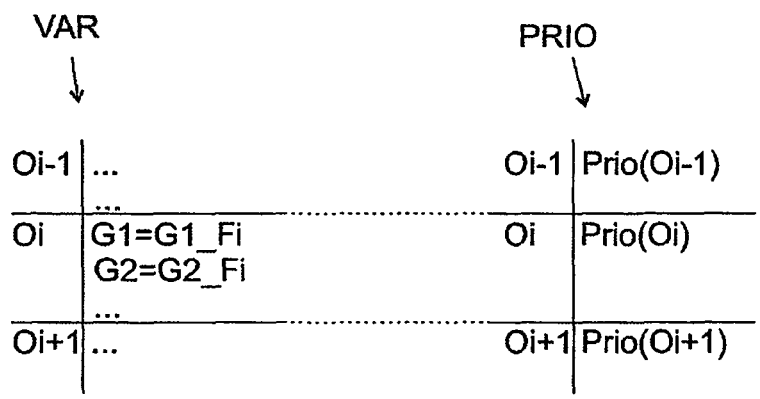
FIG. 6 shows contents of the control files used in the fourth embodiment.

While compiling, compiler COMP creates a control file VAR, in which, as shown in FIG. 6, for each object code function Oi, the symbol used in this object code for a global variable such as G1, G2 is indicated, in this case G1_Fi and G2_Fi. Control file VAR preferably has form that permits editing using a conventional text editor, which allows a developer to add by hand the entries of the control file for functions On+1 through Om, which are not compiled by compiler COMP, but which exist in the form of symbolic object code from the start, the correspondences between the designations of global variables used in source codes S1 through Sn and their designations in object codes On+1, Om.

As likewise shown in FIG. 6, a second control file PRIO provides for each object code function Oi, i=1, . . . , m a priority value PRIO(Oi), which indicates the right of the relevant function to interrupt the execution of other functions.

In the symbolic object codes O1, . . . , On, a linker LINK replaces the symbols by references to explicit memory spaces in order thus to produce an executable application. For this purpose, the linker takes into account the content of control files VAR and PRIO. Only in the case of a function having the highest possible priority level does the linker replace the symbol used in this function for a global variable by a reference to the actual memory space of this variable. Before the call of a function having a priority level other than the highest possible priority level, the linker integrates a call of a copying function I, which creates a copy of a global variable used by the function, and in the object code of the respective function, the linker replaces the symbols used in this function for the global variable by references to the address of the copy created by the copying function. If the function performs a write access to the global variable, then additionally a copy-back function C is integrated following the completion of the function, which copies the value of the copy of the global variable back to its actual memory space.

Consequently, in the executable application produced by the linker, up to k−1 copies of a global variable are created if k is the number of the possible priority levels of the functions O1 through Om, and functions having the same priority level, which cannot interrupt one another, access an identical copy. In this manner, as in the refinements of FIGS. 3 and 4, the memory space required for creating the copies is here limited to a minimum.

What is claimed is:

1. A method for avoiding data inconsistency between accesses of different functions of an application to a global variable in a data processing system, the method comprising:
   a) providing object codes of a plurality of functions to be executed in the data processing system and identifying those functions of the plurality of functions, called interfering functions, which access an identical global variable;
   b) selecting at least one interfering function;
   c) inserting a step of initialization of an auxiliary variable using a value of the global variable into an object code of each function selected in step b) or of a function calling a selected function prior to its call; and
   d) replacing a symbol of the global variable in the object code of the selected function by a reference to a memory space of the auxiliary variable;
   wherein in d) in the object code of the selected function, the symbol of the global variable is replaced by a symbol of the auxiliary variable and subsequently the symbol of the auxiliary variable is replaced by the reference to a storage space of the auxiliary variable,
   wherein, if at least one of the replacements performed on the selected function concerns a write access, a step of overwriting the global variable with a value of the auxiliary variable is inserted,
   wherein an identification of the interfering functions in step a) occurs based on information provided in addition to the object code of the selected function, and
   wherein ability of the functions to interrupt one another is detected based on priority values of the functions indicated in the additionally provided information.

2. The method as recited in claim 1, wherein in step d) a linker replaces the symbol of the global variable directly by the reference to the memory space of the auxiliary variable.

3. The method as recited in claim 2, wherein the linker in at least one non-selected interfering function replaces the symbol of the global variable by a reference to a memory space of the global variable.

4. The method as recited in claim 1, wherein replacements performed on selected function are logged.

5. A method for avoiding data inconsistency between accesses of different functions of an application to a global variable in a data processing system, the method comprising:
   a) providing symbolic object codes of a plurality of functions to be executed in the data processing system and identifying those functions of the plurality of functions, called interfering functions, which access an identical global variable, the global variable in a symbolic object code of each function accessing the identical global variable being designated by a symbol specific for this function;
   b) selecting at least one interfering function;
   c) insertion of an instruction for copying the global variable to a memory space assigned to the symbol specific for the function in every function selected in step b) or in a function calling a selected function prior to its call; and
   d) for every function not selected in step b): linking the respective symbol specific for the function to a memory space assigned to the global variable;
   wherein the interfering functions are identified based on a table, which contains symbols used in the interfering functions for the global variable,
   wherein the object code of several of the interfering functions is compiled from source code, and a compiler in compiling replaces an identical name of the global variable contained in the source code of functions by a symbol specific for each function and creates the table,
   wherein, if the selected function performs a write access to the memory space associated with the symbol specific to the function, a step of overwriting the global variable with the value of the copy is inserted,
   wherein the identifying of step a) occurs based on information provided in addition to the symbolic object code, and
   wherein ability of the functions to interrupt one another is detected based on priority values of the functions indicated in the additionally provided information.

6. The method as recited in claim 5, further comprising:
   a') identifying functions among the interfering functions, which are able to be interrupted by another function, only functions identified in step a') being selected in step b).

7. A development tool, comprising:
   a hardware processor configured to include:
      an input interface for receiving a symbolic object code of functions;
      a logic unit for identifying interfering functions accessing an identical global variable;
      an object code processing unit for replacing a symbol of the identical global variable by a reference to a memory space, initialized using a value of the identical global variable, of an auxiliary variable in the object code of at least one function selected from among the interfering functions; and
      a linker for linking the object code of a plurality of functions to form an executable application following processing by the object code processing unit;
   wherein the interfering functions are identified based on a table, which contains symbols used in the interfering functions for the global variable,
   wherein the object code of several of the interfering functions is compiled from source code, and a compiler in compiling replaces an identical name of the global variable contained in the source code of functions by a symbol specific for each function and creates the table,
   wherein, if the selected function performs a write access to the memory space associated with the symbol specific to the function, a step of overwriting the global variable with the value of the copy is inserted, wherein the identifying of step a) occurs based on information provided in addition to the symbolic object code, and wherein ability of the functions to interrupt one another is detected based on priority values of the functions indicated in the additionally provided information.

8. A development tool, comprising:

a hardware processor configured to include:

- an input interface for receiving an object code of functions;
- a logic unit for identifying interfering functions accessing an identical global variable, the global variable in the object code of every function accessing it being designated by a different symbol;
- an object code processing unit for inserting an instruction for copying the identical global variable to a memory space associated with a function-specific symbol of a selected function; and
- a linker for linking the object code of the functions to form an executable application following processing by the object code processing unit, which is set up to link the symbol used by the selected function for the global variable to the memory space assigned to this symbol and a symbol used by a non-selected function for the global variable to a memory space of the global variable;

wherein the interfering functions are identified based on a table, which contains symbols used in the interfering functions for the global variable, wherein the object code of several of the interfering functions is compiled from source code, and a compiler in compiling replaces an identical name of the global variable contained in the source code of functions by a symbol specific for each function and creates the table, and wherein, if the selected function performs a write access to the memory space associated with the symbol specific to the function, a step of overwriting the global variable with the value of the copy is inserted, wherein the identifying of step a) occurs based on information provided in addition to the symbolic object code, and wherein ability of the functions to interrupt one another is detected based on priority values of the functions indicated in the additionally provided information.

\* \* \* \* \*

UNITED STATES PATENT AND TRADEMARK OFFICE
CERTIFICATE OF CORRECTION

PATENT NO.        : 8,464,236 B2                                                      Page 1 of 1
APPLICATION NO.   : 11/547940
DATED             : June 11, 2013
INVENTOR(S)       : Woersching et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1952 days.

Signed and Sealed this
Eighth Day of September, 2015

Michelle K. Lee
*Director of the United States Patent and Trademark Office*